United States Patent
Lauter et al.

(10) Patent No.: US 7,702,098 B2
(45) Date of Patent: *Apr. 20, 2010

(54) ELLIPTIC CURVE POINT OCTUPLING FOR WEIGHTED PROJECTIVE COORDINATES

(75) Inventors: Kristin E. Lauter, La Jolla, CA (US); Denis X. Charles, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 1363 days.

This patent is subject to a terminal disclaimer.

(21) Appl. No.: 11/080,303

(22) Filed: Mar. 15, 2005

(65) Prior Publication Data

US 2006/0210069 A1 Sep. 21, 2006

(51) Int. Cl.
*H04K 1/00* (2006.01)
*H04L 9/28* (2006.01)

(52) U.S. Cl. ....................................... 380/28
(58) Field of Classification Search .................... 380/28
See application file for complete search history.

(56) References Cited

U.S. PATENT DOCUMENTS

| 5,442,707 | A  | 8/1995  | Miyaji et al. |
| 5,577,124 | A  | 11/1996 | Anshel et al. |
| 5,751,808 | A  | 5/1998  | Anshel et al. |
| 6,212,279 | B1 | 4/2001  | Reiter et al. |
| 6,415,032 | B1 | 7/2002  | Doland |
| 6,611,597 | B1 | 8/2003  | Futa et al. |
| 7,024,559 | B1 | 4/2006  | Solinas |
| 2003/0081771 | A1 | 5/2003 | Futa et al. |
| 2003/0081785 | A1 | 5/2003 | Boneh et al. |
| 2004/0123110 | A1 | 6/2004 | Zhang et al. |
| 2004/0131191 | A1 | 7/2004 | Chen et al. |
| 2004/0139029 | A1 | 7/2004 | Zhang et al. |
| 2005/0005125 | A1 | 1/2005 | Zhang et al. |
| 2005/0018850 | A1 | 1/2005 | Venkatesan et al. |
| 2005/0018851 | A1 | 1/2005 | Venkatesan et al. |
| 2005/0094806 | A1 | 5/2005 | Jao et al. |

FOREIGN PATENT DOCUMENTS

| GB | 2389678 A    | 12/2003 |
| JP | 2006221161 A | 8/2006  |

OTHER PUBLICATIONS

Lopez et al., "An Improvement of the Guafardo-Paar Method for Multiplication on Non-Supersingular Elliptic Curves" Nov. 9, 1998, pp. 91-95.*

Carter et al. "Isogenies and Duality of Abelian Varieties" Annals of Mathematics, Princeton University Press, Princeton, NJ, pp. 315-351.

Blake, Ian et al., "Elliptic Curves in Cryptography" Chapter IV "Efficient Implementation of Elliptic Curves" 1999, Cambridge University Press, pp. 1-25.

(Continued)

*Primary Examiner*—Benjamin E Lanier
(74) *Attorney, Agent, or Firm*—Lee & Hayes, PLLC

(57) ABSTRACT

Systems and methods for elliptic curve octupling for weighted projective coordinates are described. In one aspect, a weighted projective point P on an elliptic curve is identified. 8P is computed from P independent of repeated doubling operations using fewer field multiplications.

14 Claims, 3 Drawing Sheets

OTHER PUBLICATIONS

Sakai, Yasuyuki, et. al., "Efficient Scalar Multiplications on Elliptic Curves without Repeated Doublings and Their Practical Performance", 2000, Springer Berlin Heidelberg, pp. 1-15.

Hankerson, "Elliptic Curve Arithmetic", pp. 1-42.

Carter et al. "Isogenies and Duality of Abelian Varieties" Annals of Mathematics, Princeton University Press, Princeton, NJ, pp. 315-351, 1960.

Dutta et al., "Pairing-Based Cryptographic Protocols: A Survey" Cryptology Reasearch Group, Feb. 6, 2004, pp. 1-45.

* cited by examiner

ELLIPTIC CURVE POINT OCTUPLING FOR WEIGHTED PROJECTIVE COORDINATES

TECHNICAL FIELD

The systems and methods of this specification relate to elliptic curve cryptography.

BACKGROUND

Cryptographic systems are concerned with confidentiality, authenticity, integrity, and non-repudiation of data sent from a first party to a second party. Modern cryptographic schemes based on the discrete logarithm problem in a finite abelian group are designed to address these concerns. One such finite abelian group, which is becoming increasingly popular, is a group of points on an elliptic curve (EC) over a finite field with group operation provided by simple algebraic formulae. This is because such group operations are relatively simple to realize in hardware or software. However, to fully realize implementation efficiencies of using such group, system designers need to pay close attention to underlying implementations of associated field arithmetic.

For example, in scenarios where field inversions are significantly more expensive than multiplication, it is typically more efficient to utilize weighted projective coordinates so that point addition can be performed using field multiplications, as described by Blake et al, "Elliptic Curves in Cryptography", Cambridge University Press, 1999, page 59-60, and defer field inversions (usually only one such inversion operation is implemented at the end of a long sequence of multiplications). However, the computational cost of eliminating inversions is that an increased number of multiplications must generally be calculated. An efficient method from multiplying two elements in a finite group G is essential to performing efficient exponentiation.

Exponentiation is commonly used in public-key cryptography to calculate a scalar multiple n of points P on an elliptic curve, where n is a very large integer (e.g., a random number or private key), and wherein P is a weighted projective coordinate. An unsophisticated way to compute nP is to do n−1 multiplications in the group G. For cryptographic applications, the order of the group G typically exceeds $2^{160}$ elements, and may exceed $2^{2024}$ elements. Such operations are computationally intensive, and most choices of n are large enough that it becomes infeasible to calculate nP using n−1 successive multiplications by P. However, there are a number of techniques that can be used to reduce the computational costs of exponentiation.

For instance, repeated square-and-multiply algorithms (i.e., binary exponentiation) and windowing methods such as described by Blake et al, "Elliptic Curves in Cryptography", Cambridge University Press, 1999, pages 63-72, can reduce the computational costs of exponentiation. More particularly, repeated square-and-multiply algorithms divide the exponent n into smaller sums of powers of two (2), which respectively take less processing resources to compute. For instance, given a projective point P with coordinates (x, y, z) on an elliptic curve over a finite field, n can be divided into pieces of size $2^3$ (i.e., using a window of 3) to calculate scalar multiples of P ($2^3$P, or 8P) with multiple point doubling iterations. To accomplish this, existing systems typically input P=(x, y, z) into the square-and-multiply algorithm to generate 2P. Next, the coordinates for 2P (output from the first doubling operation) are input as (x, y, z) into the same square-and-multiply algorithm to obtain 4P. Finally, this iterative process is repeated one more time to input the coordinates for 4P (output from the second doubling operation) as (x, y, z) into the same square-and-multiply algorithm to obtain 8P. This process to obtain 8P involves a total of 30 field multiplications.

SUMMARY

Systems and methods for elliptic curve octupling for weighted projective coordinates are described. In one aspect, a weighted projective point P on an elliptic curve is identified. 8P is computed from P with direct formulas using 26 multiplications independent of repeated doubling operations.

BRIEF DESCRIPTION OF THE DRAWINGS

In the Figures, the left-most digit of a component reference number identifies the particular Figure in which the component first appears.

DETAILED DESCRIPTION

Overview

The systems and methods for elliptic curve point octupling for weighted projective coordinates substantially optimize weighted projective point exponentiation by calculating 8P without repeated doubling operations. In one implementation, this is accomplished via a straight in-line algorithm in 26 field multiplications. Use of 26 field multiplications to calculate 8P is in contrast to conventional techniques, which require 30 field multiplications and repeated/iterative doublings to compute 8P (i.e., 2P to 4P to 8P). By reducing the number of field multiplications to compute 8P from 30 to 26, the systems and methods provide substantial processing performance improvements over conventional 8P binary exponentiation implementations.

These and other aspects of the systems and methods for elliptic curve point octupling for weighted projective coordinates are now described in greater detail.

An Exemplary System

Although not required, the systems and methods for elliptic curve point octupling for weighted projective coordinates are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
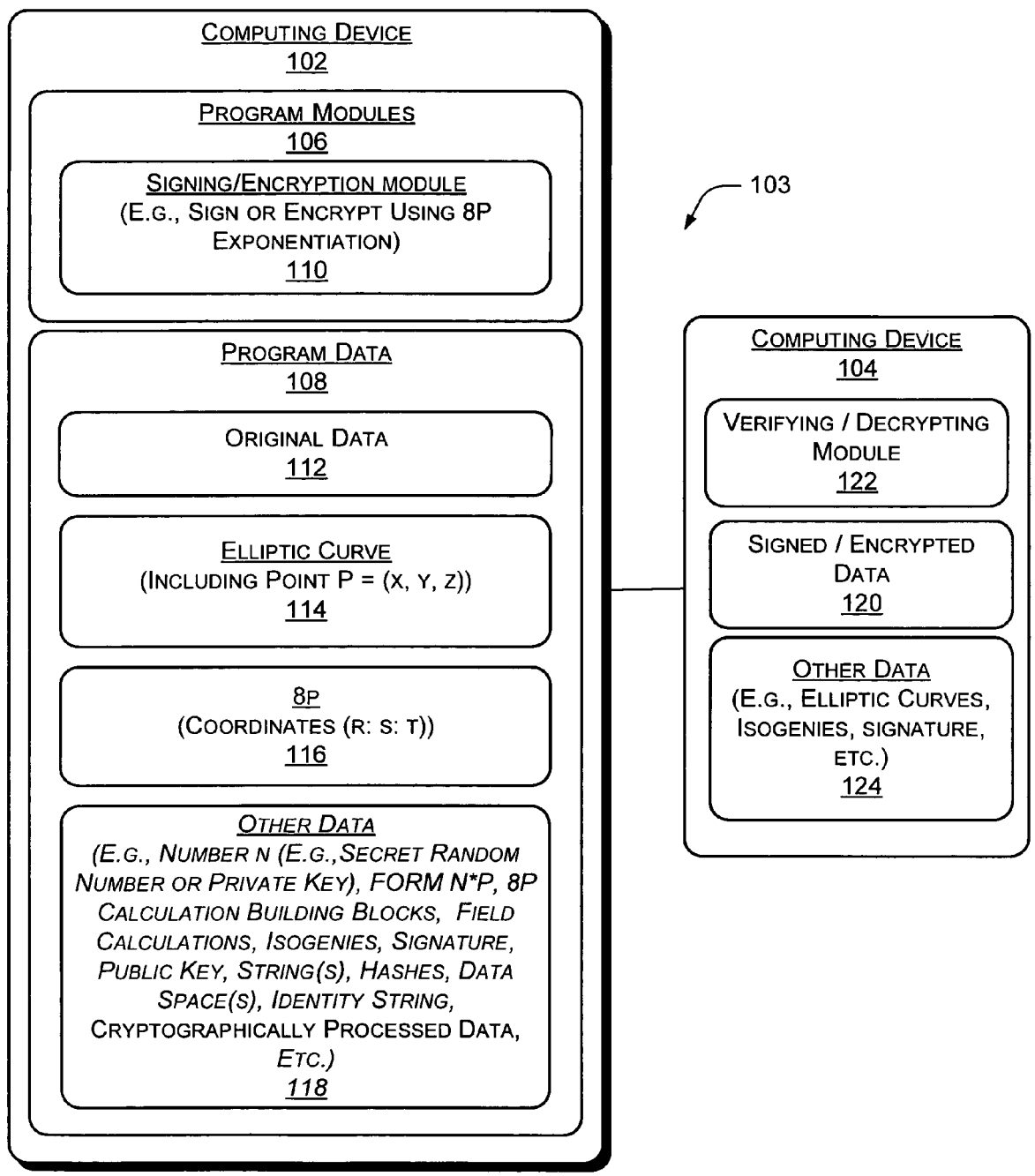
FIG. 1 illustrates an exemplary system for elliptic curve point octupling for weighted projective coordinates.

FIG. 1 illustrates an exemplary system 100 for elliptic curve point octupling for weighted projective coordinates. System 100 includes a first computing device 102 coupled over a communications network 103 to a second computing device 104. Communications network 103 may include any combination of a local area network (LAN) and a general wide area network (WAN) communication environments, such as those which are commonplace in offices, enterprise-wide computer networks, intranets, and the Internet. First and second computing devices 102 and 104 respectively represent any type of computing device such as a personal computer, a laptop, a server, handheld or mobile computing device (e.g., a cellular phone, personal digital assistant), and/or so on.

Computing device 102 includes program module(s) 106 and program data 108. Program modules 106 include, for example, signing/encrypting module 110 to respectively encrypt or sign original data 112 using elliptic curve (EC) point octupling exponentiation. Independent of the below described algorithms for elliptic curve point octupling, the particular cryptographic protocol implemented by signing/encrypting module 110 is arbitrary and a function of the particular cryptographic algorithm selected for implementation. To perform elliptic curve point octupling, signing/encrypting module 110 operates on a set of points on elliptic curve 114. Elliptic curve 114 conforms to the following equation: $y^2 = x^3 + axz^4 + bz^6$ in field characteristic not equal to 2 or 3. The characteristic of the underlying field is defined to be the smallest non-zero natural number, p, such that p times any element of the field is zero.

A point P on elliptic curve 114 is represented in weighted projective form as P=(x: y: z). In one implementation, and if the cryptographic protocol implemented is a signature scheme, the point P may be a part of the public information for the cryptosystem. In another implementation, and if the cryptographic protocol implemented is a key agreement scheme (e.g., Diffie-Hellman key agreement) or an encryption scheme (e.g., ElGamal encryption), the point P may be a part of the public or private information for the cryptosystem.

In one implementation, signing/encrypting module 110 implements elliptic curve point octupling exponentiation using a direct (non-inline) algorithm. TABLE 1 shows an exemplary direct elliptic curve point octupling algorithm for signing/encrypting module 110 to determine 8P (see, component 116 of FIG. 1) from a point P on elliptic curve 114.

TABLE 1

EXEMPLARY DIRECT ELLIPTIC CURVE OCTUPLING ALGORITHM TO COMPUTE 8P OF A POINT P ON AN ELLIPTIC CURVE $$r := \Big(3\big((3((3x^2+az^4)^2-8xy^2)^2+16ay^4z^4)^2 -$$
$$8((3x^2+az^4)^2-8xy^2)((3x^2+az^4)(12xy^2-(3x^2+az^4)^2)-8y^4)^2\big) +$$
$$256a((3x^2+az^4)(12xy^2-(3x^2+az^4)^2)-8y^4)^4 y^4 z^4\big)^2 -$$
$$8\big((3((3x^2+az^4)^2-8xy^2)^2+16ay^4z^4)^2-8((3x^2+az^4)^2-8xy^2)$$
$$((3x^2+az^4)(12xy^2-(3x^2+az^4)^2)-8y^4)^2\big)$$
$$\big((3((3x^2+az^4)^2-8xy^2)^2+16ay^4z^4)(12((3x^2+az^4)^2-8xy^2)$$
$$((3x^2+az^4)(12xy^2-(3x^2+az^4)^2)-8y^4)^2-(3((3x^2+az^4)^2-$$
$$8xy^2)^2+16ay^4z^4)^2\big)-8((3x^2+az^4)(12xy^2-(3x^2+az^4)^2)-8y^4)^4\big)^2$$

TABLE 1-continued

EXEMPLARY DIRECT ELLIPTIC CURVE OCTUPLING ALGORITHM TO COMPUTE 8P OF A POINT P ON AN ELLIPTIC CURVE $$s := \Big(3\big((3((3x^2+az^4)^2-8xy^2)^2+16ay^4z^4)^2-8((3x^2+az^4)^2-8xy^2)$$
$$((3x^2+az^4)(12xy^2-(3x^2+az^4)^2)-8y^4)^2\big)^2+256a((3x^2+az^4)$$
$$(12xy^2-(3x^2+az^4)^2)-8y^4)^4 y^4 z^4\big)(12((3((3x^2+az^4)^2-8xy^2)^2+$$
$$16ay^4z^4)^2-8((3x^2+az^4)^2-8xy^2)((3x^2+az^4)(12xy^2-(3x^2+$$
$$az^4)^2)-8y^4)^2\big)\big((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2-(3((3x^2+$$
$$az^4)^2-8xy^2)^2+16ay^4z^4)^2\big)-8((3x^2+az^4)(12xy^2-(3x^2+az^4)^2)-$$
$$8y^4)^4\big)-\big(3\big((3((3x^2+az^4)^2-8xy^2)^2+16ay^4z^4)^2-8((3x^2+az^4)^2-$$
$$8xy^2)((3x^2+az^4)(12xy^2-(3x^2+az^4)^2)-8y^4)^2\big)^2+256a((3x^2+$$
$$az^4)(12xy^2-(3x^2+az^4)^2)-8y^4)^4 y^4 z^4\big)^2-8((3((3x^2+az^4)^2-$$
$$8xy^2)^2+16ay^4z^4)(12((3x^2+az^4)^2-8xy^2)((3x^2+az^4)(12xy^2-$$
$$(3x^2+az^4)^2)-8y^4)^2-(3((3x^2+az^4)^2-8xy^2)^2+16ay^4z^4)^2\big)-$$
$$8((3x^2+az^4)(12xy^2-(3x^2+az^4)^2)-8y^4)^4\big)^4$$

$$t := 8\big((3((3x^2+az^4)^2-8xy^2)^2+16ay^4z^4)(12((3x^2+az^4)^2-8xy^2)((3x^2+$$
$$az^4)(12xy^2-(3x^2+az^4)^2)-8y^4)^2-(3((3x^2+az^4)^2-8xy^2)^2+$$
$$16ay^4z^4)^2\big)-8((3x^2+az^4)(12xy^2-(3x^2+az^4)^2)-8y^4)^4\big)$$
$$((3x^2+az^4)(12xy^2-(3x^2+az^4)^2)-8y^4)yz$$

Table 1 gives the formula for the quantity 8P=(r: s: t), where P is the point given in weighted projective coordinates (x: y: z) on the elliptic curve $y^2=x^3+axz^4+bz^6$. In contrast to conventional binary exponentiation techniques to generate 8P from a point P on an EC, which iteratively invoke the doubling algorithm to input output (e.g, 2P or 4P) from a previous point doubling operation, the direct elliptic curve point octupling algorithm of TABLE 1 calculates the coordinates (r, s, t) of 8P of a point P on an elliptic curve 114 independent of any iterative invocation of point doubling operations.

Such a direct point octupling algorithm can be used as the basic operation for an exponentiation routine using window size 3 (where the window size indicates which power of 2 is used to decompose the exponent). For example, 587*P can be calculated as 8*(8*(8*P+P)+P)+3*P instead of as 2*(2*(2* (2*(2*(2*(2*2*2*P+P)))+P))+P)+P.

In one implementation, signing/encrypting module 110 calculates 8P (116) of a point P on elliptic curve 114 using a straight line algorithm of TABLE 2 for elliptic curve point octupling exponentiation. For purposes of discussion, a straight line formula is a process for obtaining the desired result by executing each statement in the formula in succession, much like operations are implemented by a computer, with no loops or branches to the code. Program instructions of the straight line program of TABLE 2 are bolded and proceeded by a forward angle bracket. In each instruction there is the following symbol ":=", which means definition. The program instructions are shown in program description language (PDL). For purposes of comparison, an execution trace (non-bolded) of the corresponding program instructions from the direct algorithm of TABLE 2 is presented adjacent to each program instruction of the straight line algorithm of TABLE 2.

TABLE 2

EXEMPLARY STRAIGHT LINE PROGRAM FOR ELLIPTIC CURVE POINT OCTUPLING

>x2 := x^2;
$$x2 := x^2$$

>y2 := y^2;
$$y2 := y^2$$

>y4 := y2^2;
$$y4 := y^4$$

>xy2 := x*y2;
$$xy2 := xy^2$$

>yz := y*z;
$$yz := yz$$

>z2 := z^2;
$$z2 := z^2$$

>z4 := z2^2;
$$z4 := z^4$$

>az4 := a*z4;
$$az4 := az^4$$

>ay4z4 := az4*y4;
$$ay4z4 := ay^4z^4$$

>T1 := 3*x2 + az4;
$$T1 := 3x^2 + az^4$$

>T12 := T1^2;
$$T12 := (3x^2 + az^4)^2$$

>T2 := 12*xy2 − T12;
$$T2 := 12xy^2 − (3x^2 + az^4)^2$$

>T3 := T12 − 8*xy2;
$$T3 := (3x^2 + az^4)^2 − 8xy^2$$

>T32 := T3^2;
$$T32 := ((3x^2 + az^4)^2 − 8xy^2)^2$$

>T4 := T1*T2 − 8*y4;
$$T4 := (3x^2 + az^4)(12xy^2 − (3x^2 + az^4)^2) − 8y^4$$

>T42 := T4^2;
$$T42 := ((3x^2 + az^4)(12xy^2 − (3x^2 + az^4)^2) − 8y^4)^2$$

>T44 := T42^2;
$$T44 := ((3x^2 + az^4)(12xy^2 − (3x^2 + az^4)^2) − 8y^4)^4$$

>T5 := 3*T32 + 16*zy4z4;
$$T5 := 3((3x^2 + az^4)^2 − 8xy^2)^2 + 16ay^4z^4$$

>T52 := T5^2;
$$T52 := (3((3x^2 + az^4)^2 − 8xy^2)^2 + 16ay^4z^4)^2$$

>T52 := T44*256*ay4z4;
$$T6 := 256a((3x^2 + az^4)(12xy^2 − (3x^2 + az^4)^2) − 8y^4)^4 y^4 z^4$$

>T7 := T3*T42;
$$T7 := ((3x^2 + az^4)^2 − 8xy^2)((3x^2 + az^4)(12xy^2 − (3x^2 + az^4)^2) − 8y^4)^2$$

>T8 := T52 − 8*T7;
$$T8 := \left(3((3x^2 + az^4)^2 − 8xy^2)^2 + 16ay^4z^4\right)^2 − 8((3x^2 + az^4)^2 − 8xy^2) \\ ((3x^2 + az^4)(12xy^2 − (3x^2 + az^4)^2) − 8y^4)^2$$

>T82 := 3*T8^2;
$$T82 := 3\left(\left(3((3x^2 + az^4)^2 − 8xy^2)^2 + 16ay^4z^4\right)^2 − 8((3x^2 + az^4)^2 − 8xy^2) \\ ((3x^2 + az^4)(12xy^2 − (3x^2 + az^4)^2) − 8y^4)^2\right)^2$$

>T9 := T82 + T6;
$$T9 := 3\left(\left(3((3x^2 + az^4)^2 − 8xy^2)^2 + 16ay^4z^4\right)^2 − 8((3x^2 + az^4)^2 − 8xy^2) \\ ((3x^2 + az^4)(12xy^2 − (3x^2 + az^4)^2) − 8y^4)^2\right)^2 + \\ 256 a((3x^2 + az^4)(12xy^2 − (3x^2 + az^4)^2) − 8y^4)^4 y^4 z^4$$

TABLE 2-continued

EXEMPLARY STRAIGHT LINE PROGRAM FOR ELLIPTIC CURVE POINT OCTUPLING

>T92 := (T9)^2;
$$T92 := \Big(3\left(\left(3((3x^2 + az^4)^2 − 8xy^2)^2 + 16ay^4z^4\right)^2 − 8((3x^2 + az^4)^2 − 8xy^2)\right. \\ \left.((3x^2 + az^4)(12xy^2 − (3x^2 + az^4)^2) − 8y^4)^2\right)^2 + \\ 256 a((3x^2 + az^4)(12xy^2 − (3x^2 + az^4)^2) − 8y^4)^4 y^4 z^4\Big)^2$$

>S10 := T52 − 8*T7;
$$S10 := \left(3((3x^2 + az^4)^2 − 8xy^2)^2 + 16ay^4z^4\right)^2 − 8((3x^2 + az^4)^2 − 8xy^2) \\ ((3x^2 + az^4)(12xy^2 − (3x^2 + az^4)^2) − 8y^4)^2$$

>S11 := 12*T7 − T52;
$$S11 := 12((3x^2 + az^4)^2 − 8xy^2)((3x^2 + az^4)(12xy^2 − (3x^2 + az^4)^2) − \\ 8y^4)^2 − \left(3((3x^2 + az^4)^2 − 8xy^2)^2 + 16ay^4z^4\right)^2$$

>S12 := T5*S11;
$$S12 := \left(3((3x^2 + az^4)^2 − 8xy^2)^2 + 16ay^4z^4\right)\left(12((3x^2 + az^4)^2 − 8(xy)^2)\right. \\ ((3x^2 + az^4)(12xy^2 − (3x^2 + az^4)^2) − 8y^4)^2 − \\ \left.\left(3((3x^2 + az^4)^2 − 8xy^2)^2 + 16ay^4z^4\right)\right)$$

>S13 := S12 − 8*T44;
$$S13 := \left(3((3x^2 + az^4)^2 − 8xy^2)^2 + 16ay^4z^4\right)\left(12((3x^2 + az^4)^2 − 8xy^2)((3x^2 + \right. \\ az^4)(12xy^2 − (3x^2 + az^4)^2) − 8y^4)^2 − \left(3((3x^2 + az^4)^2 − 8xy^2)^2 + \right. \\ \left.\left.16ay^4z^4\right)^2\right) − 8((3x^2 + az^4)(12xy^2 − (3x^2 + az^4)^2) − 8y^4)^4$$

>S132 := S13^2;
$$S132 := \left(\left(3((3x^2 + az^4)^2 − 8xy^2)^2 + 16ay^4z^4\right)\left(12((3x^2 + az^4)^2 − 8xy^2)\right.\right. \\ ((3x^2 + az^4)(12xy^2 − (3x^2 + az^4)^2) − 8y^4)^2 − (3((3x^2 + az^4)^2 − \\ 8xy^2)^2 + 16ay^4z^4)) − 8((3x^2 + az^4)(12xy^2 − (3x^2 + az^4)^2) − \\ \left.8y^4)^4\right)^2$$

>S14 := S10*S132;
$$S14 := \begin{pmatrix}\left(3((3x^2 + az^4)^2 − 8xy^2)^2 + 16ay^4z^4\right)^2 − \\ 8((3x^2 + az^4)^2 − 8xy^2)((3x^2 + az^4)(12xy^2 − (3x^2 + az^4)^2) − 8y^4)^2\end{pmatrix} \\ \left(\left(3((3x^2 + az^4)^2 − 8xy^2)^2 + 16ay^4z^4\right)\left(12((3x^2 + az^4)^2 − 8xy^2)\right.\right. \\ ((3x^2 + az^4)(12xy^2 − (3x^2 + az^4)^2) − 8y^4)^2 − (3((3x^2 + az^4)^2 − \\ 8xy^2)^2 + 16ay^4z^4)) − 8((3x^2 + az^4)(12xy^2 − (3x^2 + az^4)^2) − \\ \left.8y^4)^4\right)^2$$

TABLE 2-continued

EXEMPLARY STRAIGHT LINE PROGRAM FOR ELLIPTIC CURVE POINT OCTUPLING

>r := T92 − 8*S14;

$$r := \left(3\left(\left(3\left((3x^2 + az^4)^2 - 8xy^2\right)^2 + 16ay^4z^4\right)^2 - \right.\right.$$
$$8\left((3x^2 + az^4)^2 - 8xy^2\right)\left((3x^2 + az^4)(12xy^2 - (3x^2 + az^4)^2) - 8y^4\right)^2\right)^2 +$$
$$256a\left((3x^2 + az^4)(12xy^2 - (3x^2 + az^4)^2) - 8y^4\right)^4 y^4 z^4\right)^2 -$$
$$8\left(\left(3\left((3x^2 + az^4)^2 - 8xy^2\right)^2 + 16ay^4z^4\right)^2 - 8\left((3x^2 + az^4)^2 - 8xy^2\right)\right.$$
$$\left((3x^2 + az^4)(12xy^2 - (3x^2 + az^4)^2) - 8y^4\right)^2\right)$$
$$\left(\left(3\left((3x^2 + az^4)^2 - 8xy^2\right)^2 + 16ay^4z^4\right)\left(12\left((3x^2 + az^4)^2 - 8xy^2\right)\right.$$
$$\left.\left((3x^2 + az^4)(12xy^2 - (3x^2 + az^4)^2) - 8y^4\right)^2 - \left(3\left((3x^2 + az^4)^2 - \right.\right.\right.$$
$$\left.\left.\left.8xy^2\right)^2 + 16ay^4z^4\right) - 8\left((3x^2 + az^4)(12xy^2 - (3x^2 + az^4)^2) - 8y^4\right)^4\right)\right)^2$$

>S15 := 12*S14 − T92;

$$S15 := 12\left(\left(3\left((3x^2 + az^4)^2 - 8xy^2\right)^2 + 16ay^4z^4\right)^2 - 8\left((3x^2 + az^4)^2 - \right.\right.$$
$$8xy^2\right)\left((3x^2 + az^4)(12xy^2 - (3x^2 + az^4)^2) - 8y^4\right)^2\right)\left(\left(3\left((3x^2 + az^4)^2 - \right.\right.$$
$$\left.8xy^2\right)^2 + 16ay^4z^4\right)\left(12\left((3x^2 + az^4)^2 - 8xy^2\right)\left((3x^2 + az^4)(12xy^2 - \right.\right.$$
$$\left.(3x^2 + az^4)^2\right) - 8y^4\right)^2 - \left(3\left((3x^2 + az^4)^2 - 8xy^2\right)^2 + 16ay^4z^4\right)\right) -$$
$$8\left((3x^2 + az^4)(12xy^2 - (3x^2 + az^4)^2) - 8y^4\right)^4\right) - \left(3\left(3\left((3x^2 + \right.\right.\right.$$
$$\left.az^4\right)^2 - 8xy^2\right)^2 + 16ay^4z^4\right)^2 - 8\left((3x^2 + az^4)^2 - 8xy^2\right)\left((3x^2 + az^4)\right.$$
$$\left.(12xy^2 - (3x^2 + az^4)^2) - 8y^4\right)^2\right)^2 + 256a\left((3x^2 + az^4)(12xy^2 - \right.$$
$$(3x^2 + az^4)^2) - 8y^4\right)^4 y^4 z^4\right)^2$$

>S134 := S13^2;

$$S134 := \left(\left(3\left((3x^2 + az^4)^2 - 8xy^2\right)^2 + 16ay^4z^4\right)\left(12\left((3x^2 + az^4)^2 - 8xy^2\right)\right.$$
$$\left((3x^2 + az^4)(12xy^2 - (3x^2 + az^4)^2) - 8y^4\right)^2 - \left(3\left((3x^2 + az^4)^2 - \right.\right.$$
$$\left.8xy^2\right)^2 + 16ay^4z^4\right) - 8\left((3x^2 + az^4)(12xy^2 - (3x^2 + az^4)^2) - \right.$$
$$8y^4\right)^4\right)^4$$

>s := T9*S15 − 8*S134;

$$s := \left(3\left(\left(3\left((3x^2 + az^4)^2 - 8xy^2\right)^2 + 16ay^4z^4\right)^2 - 8\left((3x^2 + az^4)^2 - 8xy^2\right)\right.\right.$$
$$\left((3x^2 + az^4)(12xy^2 - (3x^2 + az^4)^2) - 8y^4\right)^2\right)^2 + 256a\left((3x^2 + az^4)\right.$$
$$\left.(12xy^2 - (3x^2 + az^4)^2) - 8y^4\right)^4 y^4 z^4\right)\left(12\left(\left(3\left((3x^2 + az^4)^2 - 8xy^2\right)^2 + \right.\right.\right.$$
$$\left.16ay^4z^4\right)^2 - 8\left((3x^2 + az^4)^2 - 8xy^2\right)\left((3x^2 + az^4)(12xy^2 - (3x^2 + \right.\right.$$
$$\left.az^4)^2\right) - 8y^4\right)^2\right)\left(\left(3\left((3x^2 + az^4)^2 - 8xy^2\right)^2 + 16ay^4z^4\right)\left(12\left((3x^2 + az^4)^2 - \right.\right.\right.$$
$$\left.8xy^2\right)\left((3x^2 + az^4)(12xy^2 - (3x^2 + az^4)^2) - 8y^4\right)^2 - \left(3\left((3x^2 + \right.\right.\right.$$
$$\left.az^4)^2 - 8xy^2\right)^2 + 16ay^4z^4\right)\right) - 8\left((3x^2 + az^4)(12xy^2 - (3x^2 + az^4)^2) - \right.$$
$$\left.8y^4\right)^4\right)^2 - \left(3\left(3\left((3x^2 + az^4)^2 - 8xy^2\right)^2 + 16ay^4z^4\right)^2 - 8\left((3x^2 + az^4)^2 - \right.\right.$$
$$\left.8xy^2\right)\left((3x^2 + az^4)(12xy^2 - (3x^2 + az^4)^2) - 8y^4\right)^2\right)^2 + 256a\left((3x^2 + \right.$$
$$\left.az^4)(12xy^2 - (3x^2 + az^4)^2) - 8y^4\right)^4 y^4 z^4\right)^2\right) - 8\left(\left(3\left((3x^2 + az^4)^2 - \right.\right.$$
$$\left.8xy^2\right)^2 + 16ay^4z^4\right)\left(12\left((3x^2 + az^4)^2 - 8xy^2\right)\left((3x^2 + az^4)(12xy^2 - \right.\right.$$
$$\left.(3x^2 + az^4)^2\right) - 8y^4\right)^2 - \left(3\left((3x^2 + az^4)^2 - 8xy^2\right)^2 + 16ay^4z^4\right)\right) -$$
$$8\left((3x^2 + az^4)(12xy^2 - (3x^2 + az^4)^2) - 8y^4\right)^4\right)^4$$

TABLE 2-continued

EXEMPLARY STRAIGHT LINE PROGRAM FOR ELLIPTIC CURVE POINT OCTUPLING

>t := 8*S13*T4*yz;

$$t := 8\left(\left(3\left((3x^2 + az^4)^2 - 8xy^2\right)^2 + 16ay^4z^4\right)\left(12\left((3x^2 + az^4)^2 - 8xy^2\right)\left((3x^2 + \right.\right.\right.$$
$$\left.az^4)(12xy^2 - (3x^2 + az^4)^2) - 8y^4\right)^2 - \left(3\left((3x^2 + az^4)^2 - 8xy^2\right)^2 + \right.$$
$$\left.16ay^4z^4\right) - 8\left((3x^2 + az^4)(12xy^2 - (3x^2 + az^4)^2) - 8y^4\right)^4\right)$$
$$\left((3x^2 + az^4)(12xy^2 - (3x^2 + az^4)^2) - 8y^4\right)yz$$

As shown by TABLE 2, the straight line algorithm systematically generates building blocks, or pieces of the equations presented in TABLE 1. For purposes of exemplary illustration, such building blocks are represented with respective portions of "other data" 118 For example, the definition "xy2:=x*y2" sets xy2 equal to x*y2. Notice that later in the sequence, the term T2 leverages the definition of xy2 as T2:=12*xy2−T12, without having to recalculate x*y2, etc. In this manner, the number of field calculations needed to compute (r, s, t) of 8P of a point on an elliptic curve 114 is reduced to twenty six (26). That is, signing/encrypting module 110 generates 12 squares and implements 14 multiplications for a total of 26 field multiplications to determine coordinates (r, s, t) of 8P (116) for point P on an elliptic curve 114. This is a significant reduction in the number of field multiplications represented by existing techniques.

Signing/encrypting module 110 cryptographically processes original data 112 using any public key-based cryptographic algorithm that has been modified to implement elliptic curve octupling exponentiation, to generate cryptographically processed data. Cryptographically processed data is shown as a respective portion of "other data" 118. Although such cryptographic processing has been described with respect to RSA, Diffie-Hellman key exchange, and ElGamal encryption, signing/encrypting module 110 can employ other algorithms modified to utilize elliptic curve octupling exponentiation, to cryptographically process original data. In other words, the particular public key-based cryptographic algorithm implemented by signing/encrypting module 110, independent of the algorithm for calculating 8P of points on an elliptic curve 114 as shown above in TABLES 1 and 2, is arbitrary because it is a function of the particular cryptographic algorithm selected for implementation.

For example, respective implementations of signing/encrypting module 110 implement one or more of the following cryptographic protocols: identity-based cryptography (e.g., plain, blind, proxy, ring, undeniable, etc.), encryption protocols (e.g., authenticated, broadcast, encryption with keyword search, etc.), batch signatures, key agreement (plain, authenticated, group, etc.), trust authorities and public key certification, hierarchical cryptosystems, threshold cryptosystems and signatures, chameleon hash and signatures, authentication, applications and systems, access control, key agreement, non-interactive key distribution, credentials (e.g., anonymous, hidden, self-blindable, etc.), secret handshakes, provably secure signatures, short signatures, aggregate, ring, and verifiably encrypted signatures, blind and partially blind signatures, proxy signatures, undeniable signatures, signcryption, multi-signatures and threshold signatures, limited-verifier and designated-verifier signatures, threshold cryptosystems, hierarchical and role-based cryptosystems, chameleon hash and signatures, verifiable random functions, strongly insulated encryption, intrusion-resilient encryption, certificate-less PKC, al, traitor tracing, and/or so on.

In one implementation, device 102 communicates cryptographically processed data to device 104 for verifying/decrypting. For purposes of exemplary illustration, cryptographically processed data received by device 104 is shown as signed/encrypted data 120. Computing device 104 includes verifying/decrypting module 122 to verify or decrypt the received cryptographically processed data. In one scenario, verifying/decrypting module 118 verifies as cryptographically processed data when the cryptographically processed data has been cryptographically signed. In this scenario, verifying/decrypting module 118 utilizes one or more implementations of the elliptic curve point octupling exponentiation described above to verify the cryptographically processed data. In another scenario, verifying/decrypting module 116 decrypts cryptographically processed data that has been encrypted. In this scenario, verifying/decrypting module 118 utilizes one or more implementations of the elliptic curve point octupling exponentiation described above to decrypt the cryptographically processed data.

Exemplary Elliptic Curve Point Octupling

Figure 2:
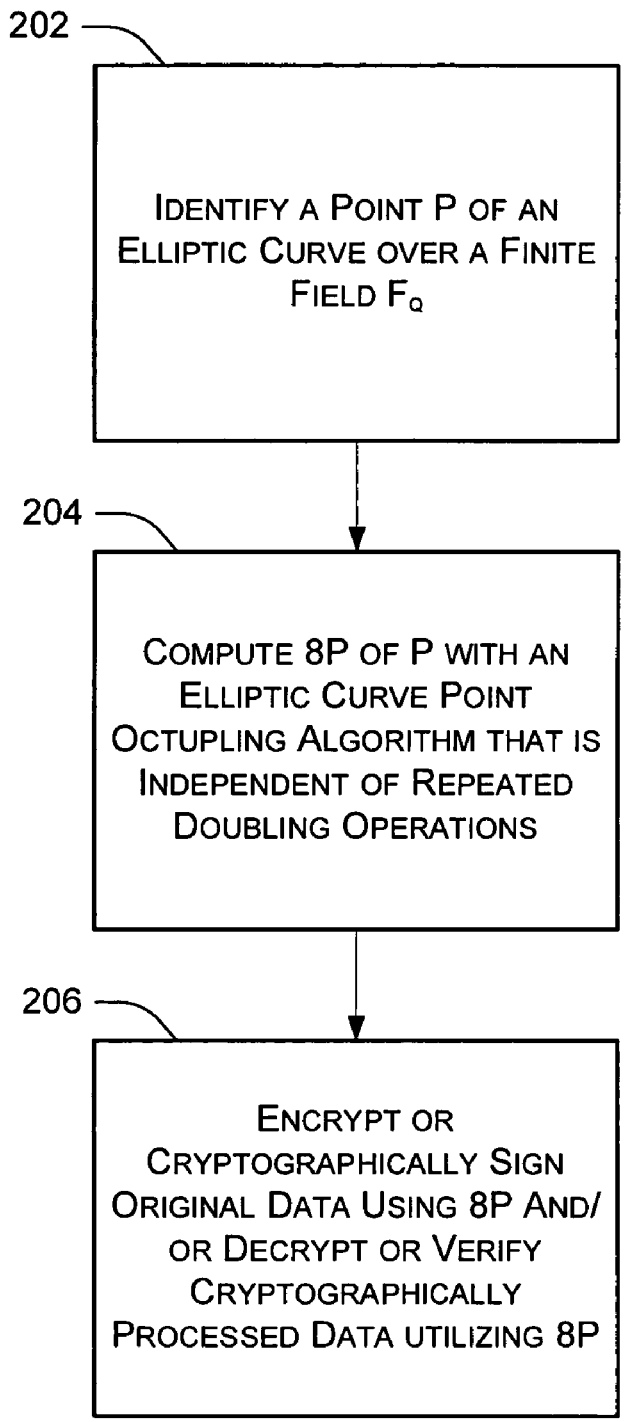
FIG. 2 shows an exemplary procedure for elliptic curve point octupling for weighted projective coordinates.

FIG. 2 shows an exemplary procedure 200 to for elliptic curve point octupling for weighted projective coordinates. For purposes of discussion and exemplary illustration, the operations of procedure 200 are described with respect to components of FIG. 1. To this end, the left-most digit of a component reference number identifies the particular figure in which the component first appears. At block 202, signing/encrypting module 110 (FIG. 1) identifies a point P of an elliptic curve 114 over a finite field $F_q$. Point P has weighted projective coordinates of (x, y, z). At block 202, signing/encrypting module 110 computes 8P of P independent of repeated doubling operations. 8P has coordinates (r, s, t). In one implementation, 8P is computed using a direct elliptic curve point octupling algorithm, such as shown above in TABLE 1. In another implementation, 8P is computed using a straight-line elliptic curve point octupling algorithm with 26 field multiplications, such as shown above in TABLE 2. At block 206, results of the elliptic curve point octupling algorithm are utilized to encrypt or cryptographically sign original data, or decrypt or verify cryptographically processed data.

An Exemplary Operating Environment

Figure 3:
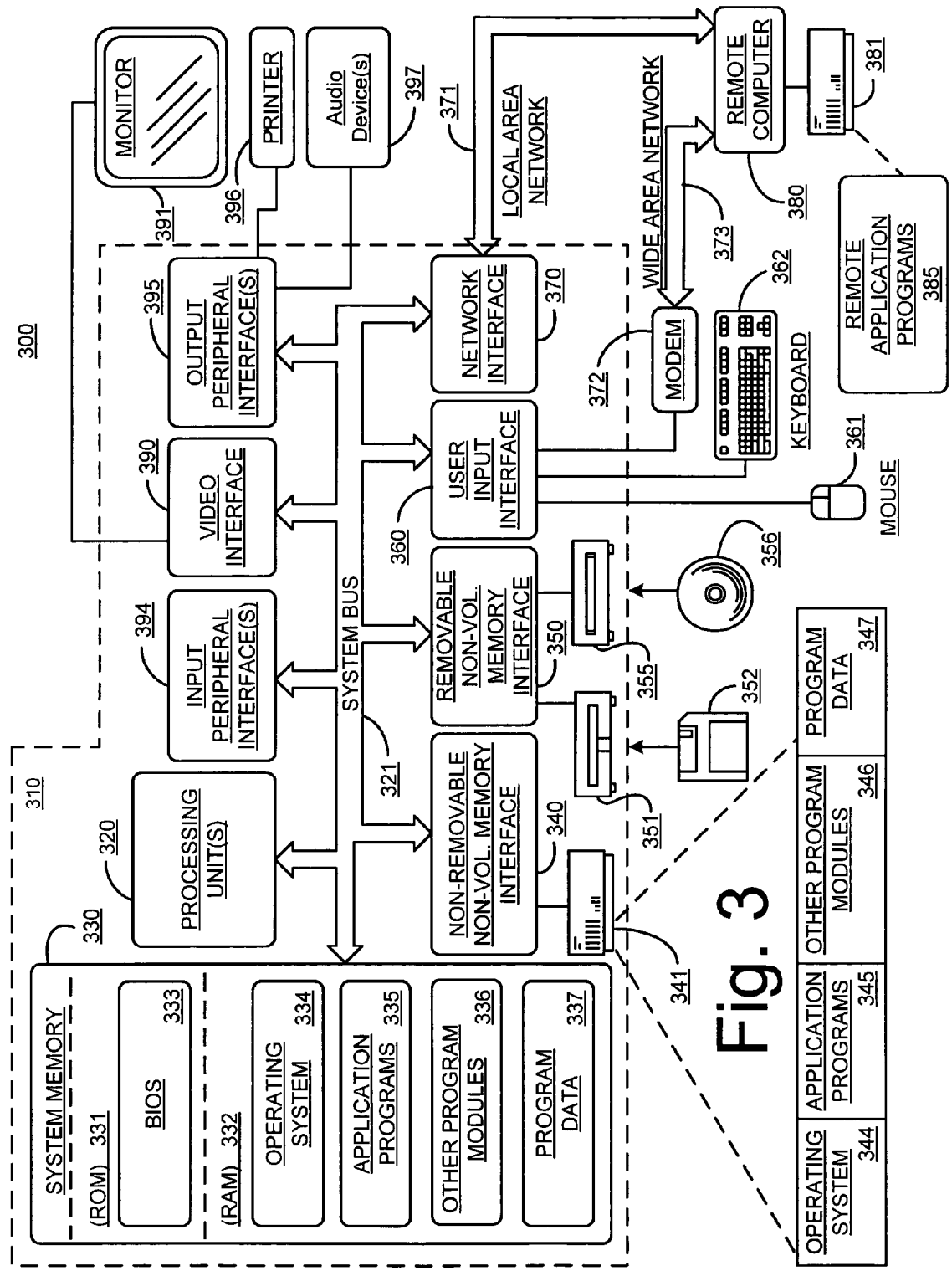
FIG. 3 illustrates an example of a suitable computing environment for fully or partially implementing the systems and methods for elliptic curve point octupling for weighted projective coordinates.

FIG. 3 illustrates an example of a suitable computing environment in which elliptic curve octupling for weighted projective coordinates may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system elliptic curve octupling for weighted projective coordinates includes a general purpose computing device in the form of a computer 310 implementing, for example, system 100 of FIG. 1. The following described aspects of computer 310 are exemplary implementations of computing devices 102 and/or 104 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 includes, for example program modules of computing devices 102 or 104 of FIG. 1. Program data 337 includes, for example, program data of computing devices 102 or 104 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio device(s) 397, which may be connected through an output peripheral interface 395.

The computer 310 operates in a networked environment using logical connections to one or more remote computers, such as a remote computer 380. In one implementation, remote computer 380 represents computing device 102 or networked computer 104 of FIG. 1. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

Conclusion

Although the systems and methods for elliptic curve octupling for weighted projective coordinates have been described in language specific to structural features and/or methodological operations or actions, it is understood that the implementations defined in the appended claims are not necessarily limited to the specific features or actions described. For example, although signing/encryption module 110 (FIG. 1) and verifying/decrypting module 122 (FIG. 1) are shown on different respective computing devices (i.e., devices 102 and 104), in another implementation, logic associated with these program modules can be implemented on a single computing device 102. Accordingly, the specific features and operations of system 100 are disclosed as exemplary forms of implementing the claimed subject matter.

The invention claimed is:

1. A method implemented by a single instruction multiple data (SIMD) computing system, the method comprising:
identifying by the SIMD computing system, coordinates x, y, and z of a weighted projective point P on an elliptic curve;
computing by the SIMD, coordinates r, s, and t for 8P of P independent of repeated doubling operations;
storing the coordinates r, s, and t to a computer readable storage medium associated with the computing system for subsequent use by the SIMD computing system;

wherein computing 8P with a straight-line elliptic curve point octupling algorithm results in 26 field multiplications to calculate 8P;

receiving original data;

determining 8P for respective points on the elliptic curve with a direct or an inline direct elliptic curve point octupling algorithm; and encrypting or signing the original data based upon a result of the direct or the inline direct elliptic curve point octupling algorithm.

2. A method as recited in claim 1, wherein the straight-line elliptic curve point octupling algorithm comprises the following, wherein the symbol := represents a define operation:

$x2 := x^2;$ $y2 := y^2;$ $y4 := y2^2;$ $xy2 := x*y2;$ $yz := y*z;$ $z2 := z^2;$ $z4 := z2^2;$ $az4 := a*z4;$ $ay4z4 := az4*y4;$ $T1 := 3*x2 + az4;$ $T12 := T1^2;$ $T2 := 12*xy2 - T12;$ $T3 := T12 - 8*xy2;$ $T32 := T3^2;$ $T4 := T1*T2 - 8*y4;$ $T42 := T4^2;$ $T44 := T42^2;$ $T5 := 3*T32 + 16*ay4z4;$ $T52 := T5^2;$ $T6 := T44 * 256 * ay4z4;$ $T7 := T3*T42;$ $T8 := T52 - 8*T7;$ $T82 := 3*T8^2;$ $T9 := T82 + T6;$ $T92 := (T9)^2;$ $S10 := T52 - 8*T7;$ $S11 := 12*T7 - T52;$ $S12 := T5*S11;$ $S13 := S12 - 8*T44;$ $S132 := S13^2;$ $S14 := S10*S132;$ $r := T92 - 8*S14;$ $S15 := 12*S14 - T92;$ $S134 := S132^2;$ $s := T9*S15 - 8*S134;$ and $t := 8*S13*T4*yz.$ 3. A method as recited in claim 1, wherein computing 8P further comprises computing 8P using a direct elliptic curve point octupling algorithm.

4. A method as recited in claim 3, wherein symbol := represents a define operation, and wherein the direct elliptic curve point octupling algorithm comprises:

$$r := \big(3\big(\big(3\big((3x^2 + az^4)^2 - 8xy^2\big)^2 + 16ay^4z^4\big)^2 - 8\big((3x^2 + az^4)^2 - 8xy^2\big)\big((3x^2 + az^4)(12xy^2 - (3x^2 + az^4)^2) - 8y^4\big)\big)^2 + 256a\big((3x^2 + az^4)(12xy^2 - (3x^2 + az^4)^2) - 8y^4\big)^4 y^4z^4\big)^2 - 8\big(\big(3\big((3x^2 + az^4)^2 - 8xy^2\big)^2 + 16ay^4z^4\big)^2 - 8\big((3x^2 + az^4)^2 - 8xy^2\big)\big((3x^2 + az^4)(12xy^2 - (3x^2 + az^4)^2) - 8y^4\big)\big)\big(\big(3\big((3x^2 + az^4)^2 - 8xy^2\big)^2 + 16ay^4z^4\big)\big(12\big((3x^2 + az^4)^2\big) - 8xy^2\big)\big((3x^2 + az^4)(12xy^2 - (3x^2 + az^4)^2) - 8y^4\big)^2 - \big(3\big((3x^2 + az^4)^2 - 8xy^2\big)^2 + 16ay^4z^4\big)^2\big) - 8\big((3x^2 + az^4)(12xy^2 - (3x^2 + az^4)^2) - 8y^4\big)^4\big)^2;$$

$$s := \big(3\big(\big(3\big((3x^2az^4)^2 - 8xy^2\big)^2 + 16ay^4z^4\big)^2 - 8\big((3x^2 + az^4)^2 - 8xy^2\big)\big((3x^2 + az^4)(12xy^2 - (3x^2 + az^4)^2) - 8y^4\big)\big)^2 + 256a\big((3x^2 + az^4)(12xy^2 - (3x^2 + az^4)^2) - 8y^4\big)^4 y^4z^4\big)\big(12\big(\big(3\big((3x^2 + az^4)^2 - 8xy^2\big)^2 + 16ay^4z^4\big)^2 - 8\big((3x^2 + az^4)^2 - 8xy^2\big)\big((3x^2 + az^4)(12xy^2 - (3x^2 + az^4)^2) - 8y^4\big)^2\big)\big(\big(3\big((3x^2 + az^4)^2 - 8xy^2\big)^2 + 16ay^4z^4\big)\big(12\big((3x^2 + az^4)^2 - 8xy^2\big)\big((3x^2 + az^4)(12xy^2 - (3x^2 + az^4)^2) - 8y^4\big)^2 - \big(3\big((3x^2 + az^4)^2 - 8xy^2\big)^2 + 16ay^4z^4\big)\big) - 8\big((3x^2 + az^4)(12xy^2 - (3x^2 + az^4)^2) - 8y^4\big)^2 - \big(3\big(\big(3\big((3x^2 + az^4)^2 - 8xy^2\big)^2 + 16ay^4z^4\big) - 8\big((3x^2 + az^4)^2 - 8xy^2\big)\big((3x^2 + az^4)(12xy^2 - (3x^2 + az^4)^2) - 8y^4\big)\big)^2 + 256a\big((3x^2 + az^4)(12xy^2 - (3x^2 + az^4)^2) - 8y^4\big)^4 y^4z^4\big) - 8\big(\big(3\big((3x^2 + az^4)^2 - 8xy^2\big)^2 + 16ay^4z^4\big)\big(12\big((3x^2 + az^4)^2 - 8xy^2\big)\big)\big((3x^2 + az^4)(12xy^2 - (3x^2 + az^4)^2) - 8y^4\big)^2 - \big(3\big((3x^2 + az^4)^2 - 8xy^2\big)^2 + 16ay^4z^4\big)^2\big) - 8\big((3x^2 + az^4)(12xy^2 - (3x^2 + az^4)^2) - 8y^4\big)^4\big)^4;$$ and $$t := 8\big(\big(3\big((3x^2 + az^4)^2 - 8xy^2\big)^2 + 16ay^4z^4\big)\big(12\big((3x^2 + az^4)^2 - 8xy^2\big)\big)\big((3x^2 + az^4)(12xy^2 - (3x^2 + az^4)^2) - 8y^4\big)^2 - \big(3\big((3x^2 + az^4)^2 - 8xy^2\big)^2 + 16ay^4z^4\big)^2\big) - 8\big((3x^2 + az^4)(12xy^2 - (3x^2 + az^4)^2) - 8y^4\big)^4\big)\big((3x^2 + az^4)(12xy^2 - (3x^2 + az^4)^2) - 8y^4\big)yz.$$

5. A method as recited in claim 1, the method further comprising:
receiving original data;
determining 8P for respective points on the elliptic curve with a direct or inline direct elliptic curve point octupling algorithm; and
decrypting or verifying cryptographically processed original data based on results of the direct or inline direct elliptic curve point octupling algorithm.

6. A computer-readable storage medium encoded with instructions that, when executed by a processor of a device, cause the device to perform acts comprising:
identifying coordinates x, y, z of a weighted projective point P on an elliptic curve;
determining coordinates (r, s, t) associated with 8P of P independent of repeated doubling operations storing the coordinates (r, s, t) to a computer readable storage medium associated with the computing system for subsequent use by the computing system;
computing of 8P with a straight-line elliptic curve point octupling algorithm resulting in 26 field multiplications to calculate 8P;
determining 8P for respective points on the elliptic curve with a direct or an inline direct elliptic curve point octupling algorithm; and
decrypting or verifying cryptographically processed data based on results of the direct or the inline direct elliptic curve point octupling algorithm.

7. A computer-readable storage medium as recited in claim 6, wherein symbol := represents a define operation, and wherein the straight-line elliptic curve point octupling algorithm that determines r, s, t comprises:

$x2:=x^2;$ $y2:=y^2;$ $y4:=y2^2;$ $xy2:=x*y2;$ $yz:=y*z;$ $z2:=z^2;$ $z4:=z2^2;$ $az4:=a*z4;$ $ay4z4:=az4*y4;$ $T1:=3*x2+az4;$ $T12:=T1^2;$ $T2:=12*xy231\ T12;$ $T3:=T12-8*xy2;$ $T32:=T3^2;$ $T4:=T1*T2-8*y4;$ $T42:=T4^2;$ $T44:=T42^2;$ $T5:=3*T32+16*ay4z4;$ $T52:=T5^2;$ $T6:=T44*256*ay4z4;$ $T7:=T3*T42;$ $T8:=T52-8*T7;$ $T82:=3*T8^2;$ $T9:=T82+T6;$ $T92:=(T9)^2;$ $S10:=T52-8*T7;$ $S11:=12*T7-T52;$ $S12:=T5*S11;$ $S13:=S12-8*T44;$ $S132:=S13^2;$ $S14:=S10*S132;$ $r:=T92-8*S14;$ $S15:=12*S14-T92;$ $S134:=S132^2;$ $s:=T9*S15-8*S134;$ and $t:=8*S13*T4*yz.$ 8. A computer-readable storage medium as recited in claim 6, the acts further comprising computing 8P using a direct elliptic curve point octupling algorithm.

9. A computer-readable storage medium as recited in claim 8, wherein symbol := represents a define operation, and wherein the direct elliptic curve point octupling algorithm that determines r, s, t comprises:

$$r := \Big(3\big((3((3x^2+az^4)^2-8xy^2)^2+16ay^4z^4\big)^2 - $$
$$8((3x^2+az^4)^2-8xy^2)((3x^2+az^4)(12xy^2-(3x^2+az^4)^2)-$$
$$8y^4)\big)^2 + 256a((3x^2+az^4)(12xy^2-(3x^2+az^4)^2)-$$
$$8y^4)^4 y^4 z^4\big)^2 - 8\big((3((3x^2+az^4)^2-8xy^2)^2+16ay^4z^4)^2-$$
$$8((3x^2+az^4)^2-8xy^2)((3x^2+az^4)(12xy^2-(3x^2+az^4)^2)-$$
$$8y^4)^2\big)\big((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2-$$
$$(3((3x^2+az^4)^2-8xy^2)^2+16ay^4z^4)\big)-8((3x^2+az^4)(12xy^2-$$
$$(3x^2+az^4)^2)-8y^4)^4\Big)^2;$$

-continued $$s := \left(3\left(\left(3\left((3x^2+az^4)^2-8xy^2\right)^2+16ay^4z^4\right)^2-8\left((3x^2+\right.\right.\right.$$
$$az^4)^2-8xy^2)\left((3x^2+az^4)(12xy^2-(3x^2+az^4)^2)-8y^4\right)^2\right)^2+$$
$$256a\left((3x^2+az^4)(12xy^2-(3x^2+az^4)^2)-8y^4\right)^4y^4z^4\right)$$
$$\left(12\left(\left(3\left((3x^2+az^4)^2-8xy^2\right)^2+16ay^4z^4\right)^2-8\left((3x^2+az^4)^2-\right.\right.\right.$$
$$8xy^2)\left((3x^2+az^4)(12xy^2-(3x^2+az^4)^2)-8y^4\right)^2\right)$$
$$\left(\left(3\left((3x^2+az^4)^2-8xy^2\right)^2+16ay^4z^4\right)\left(12\left((3x^2+az^4)^2-\right.\right.\right.$$
$$8xy^2)\left((3x^2+az^4)(12xy^2-(3x^2+az^4)^2)-8y^4\right)^2-$$
$$\left(3\left((3x^2+az^4)^2-8xy^2\right)^2+16ay^4z^4\right)^2\right)-8((3x^2+az^4)$$
$$(12xy^2-(3x^2+az^4)^2)-8y^4)^4)^2-\left(3\left(\left(3((3x^2+az^4)^2-\right.\right.\right.$$
$$8xy^2)^2+16ay^4z^4\right)^2-8((3x^2+az^4)^2-8xy^2)((3x^2+az^4)$$
$$(12xy^2-(3x^2+az^4)^2)-8y^4)^2\right)^2+256a((3x^2+az^4)(12xy^2-$$
$$(3x^2+az^4)^2)-8y^4)^4y^4z^4)-8\left(\left(3((3x^2+az^4)^2-8xy^2)^2+\right.\right.$$
$$16ay^4z^4)\left(12((3x^2+az^4)^2-8xy^2)((3x^2+az^4)(12xy^2-\right.$$
$$(3x^2+az^4)^2)-8y^4)^2-\left(3((3x^2+az^4)^2-8xy^2)^2+16ay^4z^4\right)^2\right)-$$
$$8((3x^2+az^4)(12xy^2-(3x^2+az^4)^2)-8y^4)^4\right)^4; \text{ and}$$

$$t := 8\left(\left(3\left((3x^2+az^4)^2-8xy^2\right)^2+16ay^4z^4\right)\right.$$
$$\left(12((3x^2+az^4)^2-8xy^2)((3x^2+az^4)(12xy^2-(3x^2+az^4)^2)-\right.$$
$$8y^4)^2-\left(3((3x^2+az^4)^2-8xy^2)^2+16ay^4z^4\right)^2\right)-8((3x^2+$$
$$az^4)(12xy^2-(3x^2+az^4)^2)-8y^4)^4)((3x^2+az^4)(12xy^2-$$
$$(3x^2+az^4)^2)-8y^4)yz.$$

10. The computer-readable storage medium recited in claim 6, the acts further comprising:

determining 8P for respective points on the elliptic curve with a direct or inline direct elliptic curve point octupling algorithm; and encrypting or signing original data based on results of the direct or inline direct elliptic curve point octupling algorithm.

11. A computing device comprising:

a processor configured to support at least in part Single Input Multiple Data processing; and a memory coupled to the processor, the memory comprising instructions executable by the processor for, that when executed by a processor of the computing device, cause the computing device to perform acts comprising:

identifying coordinates x, y, z corresponding to a weighted projective point P on an elliptic curve; and computing coordinates (r, s, t) corresponding to 8P of P independent of repeated doubling operations;

storing the coordinates (r, s, t) to a computer readable storage medium associated with the computing system for subsequent use by the computing system;

computing 8P with a straight-line elliptic curve point octupling algorithm resulting in 26 field multiplications to calculate 8P;

determining 8P for respective points on the elliptic curve with a direct or inline direct elliptic curve point octupling algorithm; and encrypting or signing original data based on results of the direct or the inline direct elliptic curve point octupling algorithm; or decrypting or verifying cryptographically processed data based on results of the direct or the inline direct elliptic curve point octupling algorithm.

12. A computing device as recited in claim 11, wherein the straight-line elliptic curve point octupling algorithm determines r, s, t as follows where the symbol:= represents a define operation:

$x2:=x\hat{\ }2;$ $y2:=y\hat{\ }2;$ $y4:=y2\hat{\ }2;$ $xy2:=x*y2;$ $yz:=y*z;$ $z2:=z\hat{\ }2;$ $z4:=z2\hat{\ }2;$ $az4:=a*z4;$ $ay4z4:=az4*y4;$ $T1:=3*x2+az4;$ $T12:=T1\hat{\ }2;$ $T2:=12*xy2-T12;$ $T3:=T12-8*xy2;$ $T32:=T3\hat{\ }2;$ $T4:=T1*T2-8*y4;$ $T42:=T4\hat{\ }2;$ $T44:=T42\hat{\ }2;$ $T5:=3*T32+16*ay4z4;$ $T52:=T5\hat{\ }2;$ $T6:=T44*256*ay4z4;$ $T7:=T3*T42;$ $T8:=T52-8*T7;$ $T82:=3*T8\hat{\ }2;$ $T9:=T82+T6;$ $T92:=(T9)\hat{\ }2;$ $S10:=T52-8*T7;$ $S11:=12*T7-T52;$ $S12:=T5*S11;$ $S13:=S12-8*T44;$

S132:=S13^2;

S14:=S10*S132;

r:=T92−8*S14;

S15:=12*S14−T92;

S134:=S132^2;

s:=T9*S15−8*S134; and t:=8*S13*T4*yz.

13. A computing device as recited in claim 11, wherein the acts further comprise computing 8P using a direct elliptic curve point octupling algorithm.

14. A computing device as recited in claim 13, wherein Symbol := represents a define operation, and wherein determining r, s, t with the direct elliptic curve point octupling algorithm further comprises:

$$r := \left(3\left(\left(3((3x^2+az^4)^2-8xy^2)^2+16ay^4z^4\right)^2 - 8((3x^2+az^4)^2-8xy^2)((3x^2+az^4)(12xy^2-(3x^2+az^4)^2)-8y^4)^2\right)^2 + 256a((3x^2+az^4)(12xy^2-(3x^2+az^4)^2)-(8y^4))^4 y^4z^4\right) - 8\left(\left(3((3x^2+az^4)^2-8xy^2)^2+16ay^4z^4\right)^2 - 8((3x^2+az^4)^2-8xy^2)((3x^2+az^4)(12xy^2-(3x^2+az^4)^2)-8y^4)^2\right)\left(\left(3((3x^2+az^4)^2-8xy^2)^2+16ay^4z^4\right)(12((3x^2+az^4)^2-8xy^2)((3x^2+az^4)(12xy^2-(3x^2+az^4)^2)-8y^4)^2 - \left(3((3x^2+az^4)^2-8xy^2)^2+16ay^4z^4\right)\right) - 8((3x^2+az^4)(12xy^2-(3x^2+az^4)^2)-8y^4)^4\right)^2;$$

-continued $$s := \left(3\left(\left(3((3x^2+az^4)^2-8xy^2)^2+16ay^4z^4\right)^2 - 8((3x^2+az^4)^2-8xy^2)((3x^2+az^4)(12xy^2-(3x^2+az^4)^2)-8y^4)^2\right)^2 + 256a((3x^2+az^4)(12xy^2-(3x^2+az^4)^2)-8y^4)^4 y^4z^4\right)\left(12\left(\left(3((3x^2+az^4)^2-8xy^2)^2+16ay^4z^4\right)^2 - 8((3x^2+az^4)^2-8xy^2)((3x^2+az^4)(12xy^2-(3x^2+az^4)^2)-8y^4)^2\right)\right)\left(\left(3((3x^2+az^4)^2-8xy^2)^2+16ay^4z^4\right)(12((3x^2+az^4)^2-8xy^2)((3x^2+az^4)(12xy^2-(3x^2+az^4)^2)-8y^4)^2 - \left(3((3x^2+az^4)^2-8xy^2)^2+16ay^4z^4\right)\right) - 8((3x^2+az^4)(12xy^2-(3x^2+az^4)^2)-8y^4)^4\right) - \left(3\left(\left(3((3x^2+az^4)^2-8xy^2)^2+16ay^4z^4\right)^2 - 8((3x^2+az^4)^2-8xy^2)((3x^2+az^4)(12xy^2-(3x^2+az^4)^2)-8y^4)^2\right)^2 + 256a((3x^2+az^4)(12xy^2-(3x^2+az^4)^2)-8y^4)^4 y^4z^4\right)\right) - 8\left(\left(3((3x^2+az^4)^2-8xy^2)^2+16ay^4z^4\right)(12((3x^2+az^4)^2-8xy^2)((3x^2+az^4)(12xy^2-(3x^2+az^4)^2)-8y^4)^2 - \left(3((3x^2+az^4)^2-8xy^2)^2+16ay^4z^4\right)\right) - 8((3x^2+az^4)(12xy^2-(3x^2+az^4)^2)-8y^4)^4\right)^4; \text{ and}$$

$$t := 8\left(\left(3((3x^2+az^4)^2-8xy^2)^2+16ay^4z^4\right)\left(12((3x^2+az^4)^2-8xy^2)((3x^2+az^4)(12xy^2-(3x^2+az^4)^2)-8y^4)^2 - \left(3((3x^2+az^4)^2-8xy^2)^2+16ay^4z^4\right)\right) - 8((3x^2+az^4)(12xy^2-(3x^2+az^4)^2)-8y^4)^4\right)((3x^2+az^4)(12xy^2-(3x^2+az^4)^2)-8y^4)yz.$$

\* \* \* \* \*